United States Patent Office 2,932,665
Patented Apr. 12, 1960

2,932,665

PREPARATION OF N,N-DIETHYLTOLUAMIDES

Romeo B. Wagner, Wilmington, Del., assignor to Hercules Powder Company, Wilmington, Del., a corporation of Delaware No Drawing. Application December 30, 1957
Serial No. 705,797

8 Claims. (Cl. 260—558)

This invention relates to a process for the preparation of N,N-diethyltoluamides and more particularly to the preparation of N,N-diethyl-m-toluamide.

It has recently been established that N,N-diethyl-m-toluamide is a very effective insect repellent. The compound itself has been known for a number of years and its preparation by reaction of diethylamine with the acid chloride of m-toluic acid is recorded in the literature. When it became necessary to establish a commercial process for preparation of the amide, various procedures were investigated. Diethylamine and m-toluic acid were reacted in liquid phase in a batch process both in the presence and in the absence of a dehydration catalyst and it was found that the reaction time was quite long and that objectionable amounts of odor and color bodies were formed, as well as unwanted by-products. Also, these same reactants were brought together in a vapor phase procedure in the absence of any catalyst and it was found that conversions and yields were low. Under certain conditions, vapor phase reaction did not even occur to any measurable extent. Another procedure investigated was that involving reaction between methyl toluate and diethylamine with and without a catalyst, and the yield of the desired product was unsatisfactory.

Now in accordance with this invention it has been found that N,N-diethyltoluamides may be produced in high yield and with high conversion, and with minimum formation of color and odor bodies and other by-products, through utilization of a continuous vapor phase process involving a selective catalyst which may be either silica gel or alumina. The process involves continuously introducing diethylamine and toluic acid, in a molar ratio of amine to acid which is between about 2:1 and about 6:1, into a reaction zone containing one of the aforementioned catalysts, and passing the amine and acid in intimate contact with each other over the catalyst at a rate which corresponds to a contact time of up to about 2 minutes, the temperature being in the range of 250° to 350° C. The amide is continuously removed in the vapor state from the reaction zone and is condensed. The total reaction product may be worked up in a variety of different ways as will be described hereinafter.

There are four important variables involved in the process of this invention which mutually contribute to production of the amide in a quantity and yield which will meet commercial requirements: the particular catalysts, the temperature range, the contact time and the ratio of amine to acid.

The process of this invention is more particularly set forth in the following specific examples. All parts and percentages in this specification and claims are by weight unless otherwise noted. The following terms are defined for a better understanding of the examples:

(1) Percent reacted equals the quantity of reactant used up chemically divided by the quantity of reactant charged and multiplied by 100.

(2) Percent reaction conversion equals the quantity of product formed divided by the theoretical quantity of product expected from the quantity of reactant charged multiplied by 100.

(3) Perecent process conversion equals the quantity of product recovered divided by the theoretical quantity of the product expected from the quantity of reactant charged multiplied by 100.

(4) Percent reaction yield equals the quantity of product formed divided by the theoretical quantity of product expected from the quantity of reactant used up chemically multiplied by 100.

(5) Perecent process yield equals the quantity of product recovered divided by the theoretical quantity of product expected from the quantity of reactant used up chemically multiplied by 100.

(6) Contact time equals the millimoles of perfect gas which occupies the empty reactor volume divided by the millimoles/minute of reactants fed to the reactor. It also may be defined as the time the reactants reside in the zone of the catalyst bed, assuming the catalyst occupies no volume, and may be represented by the equation $$C_T = \frac{VTP}{1.315 M\theta}$$

where $C_T$=contact time in minutes, $V$=volume of catalytic zone in cubic feet, $T$=time in minutes, $P$=pressure in atmosphere, $M$=pound-moles of reactants, and $\theta$=temperature in degrees Kelvin.

EXAMPLES 1–5

The above examples were carried out in a tubular glass reactor fitted with an inlet at one end and an outlet at the other, and also carrying the necessary thermocouples and heating circuits. The tube had a diameter of 60 mm. and was 24 inches in length. Fitted to the inlet was an insulated adapter which was heated and served as a film vaporizer. The outlet was attached to a water-cooled condenser which in turn was attached to a glass receiver. The bottom 2 inches of the reactor contained inert packing material composed of approximately equal amounts of a first layer of ceramic Raschig rings and a second layer of glass beads. The next 18 inches of the tube was packed with silica gel catalyst of 3–8 mesh size. The final 4 inches of the tube was packed with glass beads.

The general procedure involved the preparation of feed material by the slow addition of toluic acid to the required amount of stirred diethylamine maintained at a temperature below 30° to 35° C. to minimize loss of amine. This solution was then pumped at the desired rate through the reactor, which was set at the desired temperature. The reactor effluent was collected in the receiver. The reaction product was stripped of diethylamine at atmospheric pressure to a pot temperature of about 180° C. The residue was then diluted with ether and extracted with portions of 5% sodium hydroxide until a precipitate no longer formed on acidification of the extract. The combined extracts were back washed with ether which was combined with the organic phase. The caustic layer then was acidified with HCl and heated to remove residual ether. It was cooled with stirring until the recovered toluic acid had solidified. This was isolated by filtration and dried. The organic layer containing the amide was stripped of ether under reduced pressure and the stripped material then was distilled in a packed column under reduced pressure. In all examples the amide product was collected at 160–170° C./16 mm. with about 90–95% distilling at 162–165° C./16 mm.

The data for the various runs made under the above conditions are given in Table I.

Table I

| Example No. | Molar ratio of Diethylamine to Toluic Acid | Contact Time (min.) | Reaction Temperature (°C.) | Percent Conversion to Diethyltoluamide | Percent Yield Diethyltoluamide |
|---|---|---|---|---|---|
| 1 | 2 | 0.46 | 320 | 36 | 51 |
| 2 | 3 | 0.46 | 300 | 68 | 81 |
| 3 | 5 | 0.23 | 230 | 67 | 90 |
| 4 | 3 | 0.23 | 290 | 55 | 75 |
| 5 | 5 | 0.46 | 290 | 74 | 84 |

The general procedure of these examples also was applied to pure m-toluic and p-toluic acids and found to give comparable results.

EXAMPLES 6–8

These examples were carried out in the same manner as Examples 1–5 with the exception that the reactor was packed in the following manner: 2 inches of the inert packing mixture used in Examples 1–5, 6 inches of the silica gel catalyst used in those examples, and 16 inches of glass beads. The data pertaining to the present examples are given in Table II.

Table II

| Example No. | Molar ratio of Diethylamine to Toluic Acid | Contact Time (min.) | Reaction Temperature (°C.) | Percent Conversion to Diethyltoluamide | Percent Yield Diethyltoluamide |
|---|---|---|---|---|---|
| 6 | 5 | .91 | 290 | 86 | 90 |
| 7 | 5 | .57 | 270 | 90 | 97 |
| 8 | 5 | 1.36 | 250 | 88 | 100 |

EXAMPLES 9–25

The large scale runs represented by these examples were carried out in a stainless steel reactor 24 inches in length and having an internal diameter of 6 inches. It was fitted with the necessary thermocouples and heating means and was designed for down flow and for feeding diethylamine and toluic acid separately or combined. The feed material was fed to the reactor from a feed drum through a rotameter and a preheater. The reactor effluent after passing through a condenser was collected in stainless steel product receiving tanks.

The general procedure utilized was to pass hot feed material through the reactor during the time needed to bring the reactor up to temperature. When the desired temperature level was reached, a measured run was started. The feed material was diethylammonium toluate in solution in diethylamine. The catalyst utilized was silica gel, mesh size 10. For comparative purposes, Example 9 was run in the absence of catalyst.

Three methods were used to work up the condensed effluent from the reactor. In Examples 10 and 11, which were operated with total condensation, diethylamine was removed by direct distillation followed by benzene sparging, the latter treatment effecting removal of that amount of diethylamine which existed in the reaction product as diethylammonium toluate. Toluic acid was then removed by caustic extraction, the acid recovered, and the diethyltoluamide isolated by fractionation through a 15-plate column. A typical analysis of a condensate so treated is: 48.5% diethyltoluamide, 20.2% diethylamine, 11.4% diethylammoniumtoluate and 6.99% water. This procedure also was used in Example 9 except for the final product distillation, rendered unnecessary by the fact no product was formed.

For Examples 12–16, wherein the condenser was operated under partial condensation to permit removal of diethylamine as vapor from the rest of the reaction product mixture and to condense the latter, the remaining diethylamine in the reaction product was removed by washing with sulfuric acid. Toluic acid was then removed by caustic extraction, the acid recovered, and the amide again isolated by fractionation through a 15-plate column.

For Examples 17–25, which utilized partial condensation to permit substantial removal of free diethylamine, water and other low boilers, the reaction product mixture recovered from the condenser was extracted with water, thereby removing diethylammonium toluate. The remaining product then was isolated by fractionation through a 30-plate column. A typical analysis of a product from the condenser when operated under partial condensation conditions is: 80% diethyltoluamide, 3.06% diethylamine, 6.61% diethylammoniumtoluate and 0.36% water. The corresponding effluent from the condenser analyzed: 77.81% diethylamine, 0.75% diethylammoniumtoluate and 5.7%% water.

The data for Examples 9–25 are given in Table III.

Table III

| Example No. | Depth of Catalyst Bed (inches) | Molar Ratio of Diethylamine to Toluic Acid | Contact Time (min.) | Reaction Temperature (°C.) | Percent Reacted | Percent Reaction Conversion | Percent Process Conversion | Percent Reaction Yield | Percent Process Yield |
|---|---|---|---|---|---|---|---|---|---|
| 9 | 0 | 2.00 |  | 260–300 | 0 |  |  |  |  |
| 10 | 12 | 1.94 | .99 | 286 | 81.9 | 72.2 | 72.2 | 88.2 | 88.2 |
| 11 | 12 | 2.03 | .52 | 267 | 81.3 | 82.3 | 76.6 | 101.2 | 94.3 |
| 12 | 24 | 2.07 | .98 | 305 | 78.4 | 71.3 | 70.1 | 90.9 | 89.3 |
| 13 | 24 | 4.51 | .81 | 304 | 89.1 | 89.4 | 86.7 | 100.3 | 97.4 |
| 14 | 24 | 4.51 | .77 | 288 | 89.9 | 86.0 | 84.2 | 95.6 | 93.5 |
| 15 | 24 | 4.51 | .78 | 278 | 90.6 | 84.8 | 83.3 | 93.6 | 91.9 |
| 16 | 24 | 4.51 | .79 | 268 | 90.7 | 77.5 | 78.1 | 85.3 | 86.0 |
| 17 | 24 | 4.65 | .28 | 269 | 92.3 | 80.3 | 77.1 | 86.8 | 83.4 |
| 18 | 24 | 4.65 | .28 | 259 | 91.4 |  |  |  |  |
| 19 | 24 | 4.65 | .29 | 246 | 89.7 | 74.8 | 71.3 | 83.4 | 79.6 |
| 20 | 24 | 4.69 |  | 236 | 78.8 |  |  |  |  |
| 21 | 24 | 4.69 |  | 231 | 70.8 |  |  |  |  |
| 22 | 24 | 4.69 |  | 221 | 50.6 |  |  |  |  |
| 23 | 24 | 5.04 | .73 | 267 | 91.5 | 89.4 | 88.8 | 97.6 | 96.8 |
| 24 | 24 | 5.04 | .79 | 258 | 92.7 |  |  |  |  |
| 25 | 24 | 5.04 | .84 | 246 | 92.4 | 84.1 | 81.8 | 90.9 | 88.4 |

The toluic acid used in Examples 1–8 was a mixture of approximately 67% of the m-isomer and 33% of the p-isomer. In Examples 9–25 the mixture of toluic acids was approximately 95% meta and 5% para, and it is desirable from the standpoint of the insect repellency of the amide product to have as high a concentration of the meta-isomer as possible. Preferred mixtures are those wherein the meta:para ratio is above 80:20, more desirably above 85:15. However, other mixtures of the isomeric toluic acids also may be used in the process of this invention, for example, ortho-meta, ortho-para and ortho-meta-para, and the relative amounts of the isomers may be widely varied. Furthermore, any one particular toluic acid isomer may be utilized.

One of the sources of the toluic acid feed material used in the present process is that from the oxidation of xylene isomers. The latter process now is used as a route to dimethylterephthalate and dimethylisophthalate, and when the process is operated to isolate primarily the intermediate methyl toluate, there is present a certain amount of contaminant material which includes dimethylterephthalate or dimethylisophthalate or mixtures thereof. When the methyl toluate is saponified to liberate toluic acid, terephthalic and isophthalic acids also are formed, and it has been found that these and the other impurities present may cause difficulty in the process of this invention due to the fact that they are in the form of or result in formation of tars. When necessary, it therefore is highly desirable prior to using such toluic acid in the present process to subject it to a preliminary flash distillation whereby pure toluic acid is recovered as distillate and the tars remain behind as residue.

The diethylamine used in the process is desirably 100% secondary amine and substantially anhydrous. Small amounts of primary and tertiary amines may be permitted, but they as well as any products resulting therefrom should be removed from the final product. A highly desirable way to introduce the amine and toluic acid to the reactor is in the form of the salt of the two materials, namely, diethylammoniumtoluate. The salt is conveniently formed by adding the toluic acid to the required amount of diethylamine, and by having an excess of amine present there is formed a solution of the salt in the amine, thus providing a feed material which inhibits corrosion of materials of construction which would otherwise be unsuitable.

One of the most important variables of the present process is the ratio of amine to acid. As shown by the examples, a relatively low ratio, namely, 2:1 is permissible in that satisfactory conversions and product yields are obtained, but by comparison to higher ratios of amine to acid the 2:1 ratio does not give optimum results under otherwise comparable conditions. At ratios lower than 2:1 there is insufficient conversion to meet the requirements of a commercially satisfactory continuous process. A preferred ratio is within the range of about 4:1 to about 5:1. At ratios above 6:1 no added advantages are observed.

Another significant variable in the process of this invention is the temperature range. It has been found that the reaction should be carried out between 250° and 350° C. to attain the desired results of high conversion and high product yields. The most desirable range is between about 270° and 290° C. Optimum results are obtained within this range.

Closely related to the temperature utilized is the contact time and here again it has been found that certain limits should be observed. A range of 0.1–2 minutes is permissible, but a more desirable range is between about 0.4 and about 0.8 minute. It should also be observed that shorter contact times generally may and should be used at the more elevated temperatures, whereas longer contact times should be used at the lower temperatures within the specified range.

Of utmost importance to the process is the catalyst used. The examples have shown silica gel as the catalyst, but also operable in the same manner is alumina. No other catalysts are known to give the desired results of high conversion and high product yield. The necessity of having a catalyst present is apparent from Example 9, wherein the identical reaction run in the absence of a catalyst did not result in formation of any of the desired product. That the particular catalysts specified would be useful in the process was unexpected in view of the earlier findings that there was substantially no difference in product yield when a catalyst was present or absent in the batch procedure.

The process of this invention is significant in that it provides a method for obtaining N,N-diethyltoluamides in high yield and with minimum formation of color and odor bodies and other by-products. It is particularly important in the preparation of high quality N,N-diethyl-m-toluamide, which is a most efficient insect repellent.

What I claim and desire to protect by Letters Patent is:

1. A continuous, vapor-phase process for the preparation of N,N-diethyltoluamide which comprises continuously introducing diethylamine and toluic acid, in a molar ratio of amine to acid between about 2:1 and about 6:1, into a reaction zone containing a catalyst selected from the group consisting of silica gel and alumina, passing said amine and said acid in intimate contact with each other over said catalyst at a rate corresponding to a contact time of up to about 2 minutes, the temperature being in the range of 250° to 350° C., continuously removing the vaporized amide from said reaction zone and condensing said amide.

2. The process of claim 1 wherein the molar ratio of amine to acid is about 4:1 to about 5:1.

3. The process of claim 1 wherein the contact time is about 0.4 to about 0.8 minute.

4. The process of claim 1 wherein the temperature is about 270° to about 290° C.

5. The process of claim 1 wherein the catalyst is silica gel.

6. The process of claim 1 wherein the diethylamine and toluic acid fed to the reaction zone are in the form of a solution of diethylammoniumtoluate in diethylamine.

7. The process of claim 1 wherein the toluic acid is m-toluic acid.

8. The process of claim 1 wherein the toluic acid is mixture of m- and p-toluic acids in a ratio above 80:20.

References Cited in the file of this patent

UNITED STATES PATENTS

| | | |
|---|---|---|
| 1,659,150 | Nill | Feb. 14, 1928 |
| 2,013,108 | Reppe et al. | Sept. 3, 1935 |
| 2,357,484 | Martin | Sept. 5, 1944 |